(12) United States Patent
Suwa et al.

(10) Patent No.: US 6,660,354 B2
(45) Date of Patent: Dec. 9, 2003

(54) RELEASE MATERIAL, RELEASE MATERIAL ARTICLE, AND PROCESS FOR PRODUCING THE RELEASE MATERIAL ARTICLE

(75) Inventors: Toshihiro Suwa, Sagamihara (JP); Masaru Shinohara, Tokyo (JP); Yutaka Yasui, Zama (JP); Tetsuya Toma, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/203,826

(22) PCT Filed: Feb. 28, 2001

(86) PCT No.: PCT/US01/06423

§ 371 (c)(1),
(2), (4) Date: Aug. 13, 2002

(87) PCT Pub. No.: WO01/64805

PCT Pub. Date: Sep. 7, 2001

(65) Prior Publication Data

US 2003/0118770 A1 Jun. 26, 2003

(30) Foreign Application Priority Data

Feb. 29, 2000 (JP) ........................................ 2000-058006

(51) Int. Cl.[7] .................................................. C09J 7/00
(52) U.S. Cl. ................... 428/41.8; 427/208.4; 427/505; 427/516; 428/40.1; 428/41.3; 428/4.5; 428/41.7; 428/352; 428/354
(58) Field of Search ................. 428/40.1, 41.3, 428/41.5, 41.7, 41.8, 352, 354; 427/208.4, 505, 516

(56) References Cited

U.S. PATENT DOCUMENTS

| 3,502,497 A | 3/1970 | Crocker |
| 4,339,485 A | 7/1982 | Shibano et al. |
| 4,425,176 A | 1/1984 | Shibano et al. |

FOREIGN PATENT DOCUMENTS

| JP | 40-8903 | 5/1965 |
| JP | 43-21855 | 9/1968 |
| JP | 55-65281 | 5/1980 |
| JP | 55-80479 | 6/1980 |
| JP | 55-152775 | 11/1980 |
| JP | 55-155079 | 12/1980 |
| JP | 63-202685 | 8/1988 |
| JP | 11-152459 | 6/1999 |

*Primary Examiner*—Nasser Ahmad
(74) *Attorney, Agent, or Firm*—Nancy M. Lambert (57) ABSTRACT

The present invention provides a release material formed by irradiating a release material precursor having a shear storage modulus of about $1 \times 10^2$ to about $3 \times 10^6$ Pa at 20° C. and a frequency of 1 Hz, wherein the release material has a contact angle of 15° or more, measured using a mixed solution of methanol and water (volume ratio: 90/10) having a wet tension of 25.4 mN/m. The release material of the present invention has improved anchoring to certain substrates, ensuring relatively low release strength from certain pressure-sensitive adhesives, particularly even after the exposure to a high temperature. Thus, the release materials are capable of allowing the pressure-sensitive adhesive to maintain stable residual adhesion strength.

12 Claims, 2 Drawing Sheets

RELEASE MATERIAL, RELEASE MATERIAL ARTICLE, AND PROCESS FOR PRODUCING THE RELEASE MATERIAL ARTICLE

FIELD OF THE INVENTION

The present invention relates to a release material, a release material article using the same, and a process for producing the release material article.

BACKGROUND OF THE INVENTION

Pressure-sensitive adhesive tapes and pressure-sensitive adhesive sheets are usually obtained by providing a pressure-sensitive adhesive on the surface of a substrate. In the case of tapes, the article is typically stored in a roll form. On the back surface of the substrate, a release material is usually coated so as to protect the adhesive surface and facilitate unwinding upon use. In some cases, another substrate having a release material coated thereon is used to cover and, thereby, protect the adhesive surface.

In general, release materials are roughly classified into those materials containing silicone ("silicone-type release material") and those materials not containing silicone ("non-silicone type release material"). Silicone-type release material can provide a release strength over a wide range, from relatively low (e.g., 0.1 N/25 mm or less) to relatively high (e.g., 10 N/25 mm or more). However, silicone-type release material may readily transfer to an adhesive surface due to insufficient anchoring to the substrate, for example, a plastic substrate. The transferred silicone-type release material may give rise to contamination. For examples, in the electronics industry, this may be undesirable.

Non-silicone type release material is further classified into those materials containing fluorine ("fluorine-type release material") and those materials containing a long chain alkyl group ("long chain alkyl group-type release material"). Fluorine-type release materials are generally relatively expensive and the types of solvent that can be used for diluting and coating fluorine-type release materials are typically limited to fluorine-type solvents due to solubility issues. Therefore, practical use of fluorine-type release materials is limited. Long chain alkyl group-type release materials typically consist of a copolymer of an acrylic ester, vinyl ether, and acrylamide derivative or the like and these are disclosed, for example, in Japanese Examined Patent Publication (Kokoku) Nos. 44-9599, 40-8903 and 43-21855. More specifically, Japanese Examined Patent Publication (Kokoku) No. 44-9599 discloses a release material consisting of a copolymer of octadecyl methacrylate and acrylonitrile. Japanese Examined Patent Publication (Kokoku) No. 40-8903 discloses a release material consisting of a copolymer of octadecyl vinyl ether and acrylonitrile. Also, Japanese Patent Publication (Kokoku) No. 43-21855 discloses a release material consisting of a copolymer of octadecyl acrylamide and acrylic acid.

However, these release materials are poor in anchoring to certain substrates, such as polyester. Furthermore, these release materials usually contain a group having high affinity for a pressure-sensitive adhesive, such as carboxyl group, nitrile group, amide group, or hydroxyl group. Such a group may drive the release material to readily transfer to the interface with, or into, an adjacent pressure-sensitive adhesive, or vice versa. As a result, the release material tends to be difficult to release from the pressure-sensitive adhesive or the adhesive properties, such as adhesive strength, of the pressure-sensitive adhesive tend to be decreased. These tendencies are generally more pronounced when the release material is heated to higher temperatures.

Japanese Unexamined Patent Publication (Kokai) No. 63-202685 discloses an acrylic release material obtained by crosslinking an acrylic copolymer of an acrylic ester and an acrylic compound having a functional group with a crosslinking agent. According to this publication, a crosslinking agent such as isocyanate is used for a crosslinking treatment. Crosslinking reactions involving isocyanates tend to proceed gradually and, thus, an undesirably high amount of time may be necessary for the desired performance, such as releasing strength, to be obtained in such materials. Furthermore, the above-described acrylic copolymer contains a polar group such as carboxyl group, hydroxyl group, or amide group, which may provide a higher release strength as compared with release strengths of silicone-type release materials. In addition, when an acrylic copolymer is crosslinked using an isocyanate, it tends to be difficult to release the release material from an acrylic pressure-sensitive adhesive. This tendency is generally more pronounced at a higher temperature.

Japanese Unexamined Patent Publication (Kokai) No. 11-152459 discloses a non-silicone type release material consisting of an acrylic copolymer that does not contain a polar group. This release material is obtained by polymerizing a release material forming composition containing (a) an organic compound having two or more (meth)acryloyl groups and having a number average molecular weight of 600 or more and (b) an alkyl (meth)acrylate under the irradiation of an active energy ray, such as ultraviolet ray or electron beam, while forming crosslinks through the (meth)acryloyl group, and curing the polymer. The release material of this publication contains no polar groups and even when exposed to high temperatures, the release strength is presumed to not significantly increase. However, organic compounds having two or more (meth)acryloyl groups do not effectively decrease the release strength. Although the monomer unit of alkyl (meth)acrylate, which is contained in the copolymer after curing, has a tendency for decreasing the release strength of the release material, the monomer of alkyl (meth)acrylate contained in the release material forming composition is not completely polymerized, even under irradiation of an active energy ray, and partially remains as an unreacted monomer. This may impair the stability of a residual adhesion strength of a pressure-sensitive adhesive after removal of the release material.

On the other hand, Japanese Unexamined Patent Publication (Kokai) Nos. 55-65281, 55-80479, 55-152775 and 55-155079 disclose a method for producing a pressure-sensitive adhesive tape or sheet where the release layer is a release material consisting of a polyolefin-based elastomer or a release material consisting of a mixture of a polyolefin-based elastomer and polyethylene and the adhesive layer is a pressure-sensitive adhesive mainly comprising a polyacrylic ester. The polyolefin-based elastomer used in these publications is one having a shear storage modulus according to a JIS K7213 test of $2.0 \times 10^7$ Pa or less and a surface wetting property such that the equilibrium contact angle to a standard solution having a surface tension of 50 mN/m for use in the JIS K6768 test is 55° or more at a temperature of $20 \pm 1°$ C. and a relative humidity of $65 \pm 5\%$. The release material disclosed in these publications is formed by extrusion molding and the release material obtained is not subjected to any treatment. The untreated release material has a problem in that the adhesion between this release material and a substrate supporting the release material is low.

Furthermore, the release strength of the release material from the pressure-sensitive adhesive is relatively high and in particular, when exposed to a high temperature, the release strength is increased and the release material obtained disadvantageously fails in having a sufficiently low release strength.

SUMMARY OF THE INVENTION

The present invention provides a release material that is enhanced in its anchoring to a substrate, relatively low in its release strength from a pressure-sensitive adhesive (even after the exposure to a high temperature), and capable of allowing the pressure-sensitive adhesive to hold a stable residual adhesion strength. Also disclosed are release material articles using the same and a process for producing the article.

Specifically, the present invention provides a release material formed by irradiating a release material precursor having a shear storage modulus (hereinafter sometimes referred to as a "storage modulus" or "G'") of $1 \times 10^2$ to $3 \times 10^6$ Pa at 20° C. and a frequency of 1 Hz, wherein the release material has a contact angle of 15° or more when measured using a mixed solution of methanol and water (volume ratio: 90/10) having a wet tension of 25.4 mN/m.

The release material of the present invention is enhanced in its anchoring to a substrate by using treatment of radiation on an untreated release material precursor. Furthermore, by virtue of this treatment, the release material of the present invention exhibits relatively low release strength from a pressure-sensitive adhesive, even after the exposure to a high temperature. Still further, after the release of the release material from a pressure-sensitive adhesive, the pressure-sensitive adhesive can hold a stable residual adhesion strength.

The term "contact angle" as used in the present application is defined as a contact angle measured using a mixed solution of methanol and water (volume ratio: 90/10) having a wet tension of 25.4 mN/m described in JIS K6768:1999. This measurement is conducted at a temperature of 23±1° C. and a relative humidity of 50±5%.

In present application, the term "release strength from an acrylic pressure-sensitive adhesive," as used in the evaluation of the release property of the release material from a pressure-sensitive adhesive, means a value of release strength measured by the following method. A release material layer is applied to a pressure-sensitive adhesive sheet consisting of an acrylic pressure-sensitive adhesive (PSA). The PSA is produced by forming a copolymer from a monomer consisting of butyl acrylate, acrylic acid, vinyl acetate, and 2-hydroxyethyl acrylate at a weight ratio of 100:8:2:0.2 and adding isophorone diisocyanate corresponding to 1%, in terms of the mass ratio, to crosslink the copolymer. In this state, the sheet is left standing in an oven at 110° C. for 6 hours. Thereafter, the sheet is left standing overnight at room temperature (25° C.) and used as a sample for measurement. The release strength of this sample is measured at a release angle of 180° and a release rate of 300 mm/min at room temperature (25° C.). The value, thus obtained, is defined as the release strength.

Furthermore, the shear storage modulus (G') as used in the present application is a value measured using a viscoelasticity analyzer at 20° C. and a frequency of 1 Hz.

In the present application, the terms "(meth)acrylic acid" and "alkyl (meth)acrylate" are used to indicate an acrylic acid or a methacrylic acid, and an alkyl acrylate or an alkyl methacrylate, respectively. In addition, the term "polymer" includes a binary copolymer, a ternary copolymer, a quaternary or greater copolymer and derivatives thereof. These polymers may also be used as a mixture.

DETAILED DESCRIPTION OF THE PREFERRED EMBODIMENTS

The present invention is described below by referring to the preferred embodiments. However, it would be easily understood for one skilled in the art that the present invention is not limited to these preferred embodiments.

As described above, the release material of the present invention is formed by irradiation, such by using as an ultraviolet ray or electron beam, a release material precursor having a shear storage modulus of $1 \times 10^2$ to $3 \times 10^6$ Pa at 20° C. and a frequency of 1 Hz. Examples of the release material precursor include polymers having a shear storage modulus within the above-described range, such as, for example, a poly(meth)acrylic ester, a polyolefin, or a polyvinyl ether.

One embodiment of the release material precursor according to the present invention is a copolymer consisting of two kinds of acryl monomer components, for example, a (meth)acrylate containing an alkyl group having from about 12 to about 30 carbon atoms (hereinafter sometimes referred to as a "first alkyl (meth)acrylate") and a (meth)acrylate containing an alkyl group having from 1 to about 12 carbon atoms (hereinafter referred to as a "second alkyl (meth)acrylate").

In this case, the first alkyl (meth)acrylate contains a relatively long alkyl side chain having from about 12 to about 30 carbon atoms. The relatively long alkyl side chain has a function of decreasing the surface energy of the release material. By this function, an effect of relatively preventing the pressure-sensitive adhesive from wetting over the release material surface can be obtained. Accordingly, the first alkyl (meth)acrylate acts to impart a low release strength to the finally produced release material. More specifically, in the contact angle method as an indirect method of estimating the surface energy, the release material typically has a contact angle of 15° or more. Furthermore, according to the present invention, the first alkyl (meth)acrylate does not contain a polar group on the side chain, such as carboxyl group (e.g., (meth)acrylic acid), hydroxyl group (e.g., hydroxyethyl (meth)acrylate, hydroxypropyl (meth)acrylate), or a nitrogen- or phosphorus-containing polar group (e.g., (meth)

acrylamide, morpholine (meth)acrylate and 2-acryloyloxyethyl acid phosphate). Accordingly, the first alkyl (meth)acrylate can impart relatively low release strength to the release material, not only at low temperatures, but also even after the exposure to high temperatures. In particular, as described later, when the release material precursor is irradiated, using, for example, an electron beam or ultraviolet ray, to form a release material, the release material can impart a relatively low and constant release strength of about 0.05 N/25 mm to about 2 N/25 mm.

Preferred examples of the first alkyl (meth)acrylate having a long chain alkyl group include lauryl (meth)acrylate, cetyl (meth)acrylate, octadecyl (meth)acrylate and behenyl (meth)acrylate. Although the content of this first alkyl (meth)acrylate is not limited, the first alkyl (meth)acrylate is suitably contained in an amount of approximately 10% to approximately 90% by weight based on the total amount of the first alkyl (meth)acrylate and the second alkyl (meth)acrylate. If the first alkyl (meth)acrylate content is less than about 10% by weight, the release strength may increase. Furthermore, if the content exceeds about 90% by weight, non-smooth release, namely, "jerky release" may occur because of high crystallinity thereof.

The second alkyl (meth)acrylate contains a relatively short alkyl side chain having from 1 to about 12 carbon atoms. This relatively short alkyl side chain decreases the glass transition temperature of the release material to about 30° C. or less. In turn, the release material precursor is reduced in crystallinity and also in the shear storage modulus to about $1 \times 10^2$ to about $3 \times 10^6$ Pa. As a result, smooth release can be attained between a release material article and a pressure-sensitive adhesive layer. In the present application, the shear storage modulus is measured at 20° C. and a frequency of 1 Hz using a viscoelasticity analyzer (Dynamic Analyzer RDAII, manufactured by Rheometrics).

In one embodiment of the present invention, the second alkyl (meth)acrylate containing an alkyl group having 12 carbon atoms may be the same as the first alkyl (meth)acrylate having the same number of carbon atoms. In this case, unless other components are present, the release material can be formed from a release material precursor containing a homopolymer. Furthermore, according to the present invention, the second alkyl (meth)acrylate does not contain a polar group on the side chain, such as a carboxyl group (e.g., (meth)acrylic acid), a hydroxyl group (e.g., hydroxyethyl (meth)acrylate), or a nitrogen- or phosphorus-containing polar group (e.g., (meth)acrylamide, morpholine (meth)acrylate and 2-acrloyloxyethyl acid phosphate). Therefore, similarly to the first alkyl (meth)acrylate, the second alkyl (meth)acrylate imparts a relatively low release strength, not only at a low temperature, but also at a high temperature.

Preferred examples of the second alkyl (meth)acrylate having a short chain group include butyl (meth)acrylate, hexyl (meth)acrylate, octyl (meth)acrylate, and lauryl (meth)acrylate. The content of the second alkyl (meth)acrylate is also, similarly to the first alkyl (meth)acrylate, not limited. However, the second alkyl (meth)acrylate is preferably contained in an amount of approximately 10% to approximately 90% by weight based on the total amount of the first alkyl (meth)acrylate and the second alkyl (meth)acrylate. If the second alkyl (meth)acrylate content is less than about 10% by weight, the property of the first alkyl (meth)acrylate surpasses the property of the second alkyl (meth)acrylate and higher crystallinity and jerky release may result. Furthermore, if the content exceeds about 90% by weight, the release strength tends to become higher.

The first and second alkyl (meth)acrylates each may be a (meth)acrylate having a branched side chain, such as 2-heptylundecyl acrylate, 2-ethylhexyl (meth)acrylate, and isononyl (meth)acrylate. The (meth)acrylate having a branched side chain itself reduces the crystallinity and therefore, decreases the shear storage modulus and the surface energy. Therefore, a polymer, other than the copolymer consisting of a monomer component containing a combination of a first alkyl (meth)acrylate and a second alkyl (meth)acrylate, may also be used in some cases. A homopolymer consisting of a monomer component of alkyl (meth)acrylate containing a branched alkyl group having from about 8 to about 30 carbon atoms is useful as the release material precursor and, for example, a homopolymer of 2-heptylundecyl acrylate preferably constitutes a release material precursor from the standpoint that the obtained release material can be reduced in surface energy and shear storage modulus.

Preferred release material precursors can be obtained by polymerization of alkyl (meth)acrylates in the presence of a polymerization initiator. The polymerization initiator is not particularly limited as long as it can bring about the polymerization, and examples thereof include azobis compounds, such as 2,2'-azobisisobutyronitrile, 2,2'-azobis (2-methylbutylonitrile) and 2,2-azobis(2,4-dimethylvaleronitrile); and peroxides, such as benzoyl peroxide and lauroyl peroxide. For example, 2,2'-azobisisobutyronitrile and 2,2'-azobis(2-methylbutylonitrile) are commercially available under trade names of V-60 and V-59, respectively, from Wako Pure Chemical Industries, Ltd. The content of the polymerization initiator is not limited as long as a polymer can be formed. However, the polymerization initiator is preferably contained in an amount of about 0.005% to about 0.5% by weight based on the weight of the monomer. If the polymerization initiator content is less than about 0.005% by weight, the polymerization rate tends to decrease, whereas if the content exceeds about 0.5% by weight, it tends to result in a lower molecular weight.

The polymerization of the above-described alkyl (meth) acrylates can be performed by any known method. However, a solution polymerization method, which involves dissolving the alkyl (meth)acrylates in a solvent and polymerizing them in solution is suitably used, because the polymer solution can be directly taken out and used after the completion of polymerization. In this case, the solvent is not particularly limited, but examples thereof generally include ethyl acetate, methyl ethyl ketone, and heptane. From the standpoint of controlling the molecular weight, a chain transfer agent may be suitably incorporated into the solvent. The solution polymerization of the polymerizable composition may be usually performed at a reaction temperature of about 50° C. to about 100° C. for about 3 to about 24 hours in an atmosphere of an inert gas, such as nitrogen.

In the case where the release material precursor is a poly(meth)acrylate, the polymer constituting the release material precursor suitably has a weight average molecular weight of about 100,000 to about 2,000,000. If the weight average molecular weight is less than about 100,000, the release strength may increase, whereas if the weight average molecular weight exceeds about 2,000,000, the release strength may be satisfactory, but the viscosity of the polymer solution may be increased during the synthesis, making handling of the polymer solution difficult.

As long as the above-described physical properties can be attained, the release material precursor can be constituted by a polyolefin. This polyolefin is formed of an olefin monomer having from about 2 to about 12 carbon atoms Examples of the starting monomer include linear olefins; such as ethylene, propylene, 1-butene, 1-pentene, 1-hexene, 1-heptene, 1-octene, 1-nonene, 1-decene, 1-undecene, 1-dodecene; and branched olefins, such as 4-methyl-1-pentene, 5-methyl-1-hexene, 4-methyl-1-hexene, 7-methyl-1-octene, and 8-methyl-1-nonene. However, a homopolymer of ethylene or propylene, namely polyethylene and polypropylene, generally cannot satisfy the physical property of shear storage modulus because of their crystallinity. Therefore, in the case of using ethylene, propylene or the like, the shear storage modulus is typically decreased by the copolymerization, for example, with 1-butene, 1-octene or the like. With respect to the copolymer structure, a random copolymer is most preferred from the standpoint of reducing the crystallinity. However, even if the copolymer has crystallinity, as long as the shear storage modulus is acceptable, a block copolymer may also be used. The weight average molecular weight is suitably from about 100,000 to about 2,000,000. If the weight average molecular weight is less than about 100,000, the release strength tends to increase, whereas if the weight average molecular weight exceeds about 2,000,000, the release strength may be satisfactory, but the release material precursor, when purified and dried after the polymerization, may not be easily dissolvable again in a solvent. Polyolefins having a high molecular weight can be produced by a conventionally known polymerization methods, for example, ionic polymerization, preferably coordinated anionic polymerization. Examples of the commercially available polyolefins include ethylene/propylene copolymers available under the trade names of EP01P and EP912P from JSR, an ethylene/butene copolymer available under the trade name of EBM3021P from JSR, and an ethylene/octene copolymer available under the trade name of Engage 8407 from DuPont Dow Elastomers.

The release material precursor may also be a polyvinyl ether having the above-described properties. Examples of the starting monomer of this polyvinyl ether include linear or branched vinyl ethers such as n-butyl vinyl ether, 2-ethylhexyl vinyl ether, dodecyl vinyl ether, and octadecyl vinyl ether. However, for example, polyoctadecyl vinyl ether does not satisfy the above-described physical property for the shear storage modulus and accordingly, in the case of using octadecyl vinyl ether, the shear storage modulus is typically decreased by the copolymerization, for example, with 2-ethylhexyl vinyl ether. With respect to the copolymer structure, random copolymer is most preferred from the standpoint of reducing the crystallinity. However, even if the copolymer has crystallinity, as long as the shear storage modulus is acceptable, a block copolymer may also be used. The weight average molecular weight is suitably from about 100,000 to about 2,000,000. If the weight average molecular weight is less than about 100,000, the release strength tends to increase, whereas if the weight average molecular weight exceeds about 2,000,000, the release strength may be satisfactory, but the viscosity of the polymer solution may be increased during the synthesis such that handling of the polymer solution tends to be difficult. The polyvinyl ether can be produced by ionic polymerization, for example, by cationic polymerization.

The release material precursor is provided on a substrate, preferably consisting of polyester, polyolefin, or paper, and subjected to a treatment of radiation, such as using an electron beam or ultraviolet rays, whereby a release material article can be provided in the form of a tape or sheet. In this case, the release material precursor generally has no polar functional groups, such as carboxyl groups, hydroxyl groups, or amide groups, as described above, and therefore, the release material precursor itself is expected to have poor anchoring to the substrate. However, in the present invention, it has been found that, despite the absence of a polar functional group in the release material precursor, the anchoring between the substrate and the release material can be elevated by treatment with radiation and, at the same time, the release strength between the resulting release material and a pressure-sensitive adhesive can be maintained at a relatively low value of about 0.05 to about 2 N/25 mm.

This release material article is manufactured as follows. A solution of the release material precursor is diluted with a diluent containing at least one of ethyl acetate, butyl acetate, methyl ethyl ketone, methyl isobutyl ketone, hexane, heptane, toluene, xylene, and methylene chloride, and then coated on a substrate to a predetermined thickness, thereby forming a release material precursor layer on the substrate. In this case, the diluting solvent may be the same as or different from the solvent used in the solution polymerization. These diluents are inexpensive and readily available as compared with fluorine-containing solvents used for a fluorine-type release material and therefore, the cost of materials can be reduced in the present invention. Examples of the substrates that can be used include, for example, plastics such as polyesters and polyolefins, and paper. The substrate generally used is a polyester (e.g., a polyethylene terephthalate, polyethylene naphthalate, or polybutylene terephthalate film). The thickness of the release material precursor depends on the kind of the substrate but is generally from about 0.01 to about 1 $\mu$m, preferably from about 0.05 to about 0.5 $\mu$m. If the thickness is less than about 0.01 $\mu$m, a uniform release layer may be difficult to form and the release strength may increase, whereas even if the thickness exceeds about 1 $\mu$m, the release strength would not be significantly changed.

The release material precursor is irradiated by, for example, an electron beam or ultraviolet ray. In the case of using an electron beam, the irradiation is generally performed under an inert gas, such as nitrogen. The absorbed dose thereto depends on the thickness or composition of the release material precursor layer and is usually from 1 to about 100 kGy. If the absorbed dose is less than about 1 kGy, the anchoring between the substrate and the release material may not be increased. Furthermore, if the absorbed dose exceeds about 100 kGy, a side reaction such as surface oxidation may take place to produce a polar functional group. The production of a polar functional group may give rise to deterioration of the substrate.

If an ultraviolet ray is used in place of an electron beam, the above-described inert gas is not necessary. The irradiation energy of the ultraviolet ray depends on the thickness or composition of the release material precursor layer and is usually from about 10 to about 300 mJ/cm$^2$, preferably from about 20 to about 150 mJ/cm$^2$. If the energy is less than about 10 mJ/cm$^2$, a sufficiently high anchoring to the substrate may not be attained and, if the irradiation energy exceeds about 300 mJ/cm$^2$, the release strength may increase.

It is revealed that irradiation, such as with an electron beam or ultraviolet ray, increases the anchoring between the substrate and the release material and decreases the release strength between the release material and the pressure-sensitive adhesive. Improving the anchoring between the substrate and the release material by irradiation can be completed within a very short time, as compared with conventional methods where a crosslinking agent and a release material having an active group capable of reacting with the crosslinking agent are crosslinked by adding a thermal energy or the like to improve the anchoring. As a result, the production rate of the release material article increases. Furthermore, in the present invention, a crosslinking agent is not necessary and therefore, remaining of a crosslinking agent by itself in the release material does not occur, so that a so-called "aging" or "ripening" process until the stabilization of performance as required in conventional release material articles is not necessary. Still further, by the irradiation of a radiation, the release material is inhibited from transferring to the pressure-sensitive adhesive layer and this brings about an effect that, even after the exposure to a high temperature, the low release strength between the release material and the pressure-sensitive adhesive can be maintained.

The kind of the pressure-sensitive adhesive is not particularly limited. However, when an acrylic pressure-sensitive adhesive including (meth)acrylic resin is used as a pressure-sensitive adhesive, the release material of the present invention can particularly work well in that the release strength for the pressure-sensitive adhesive is low.

Figure 1:
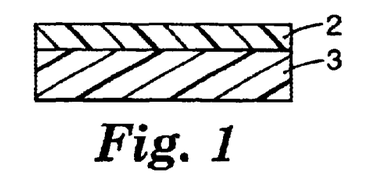
FIG. 1 is a cross-sectional view showing a release sheet according to one embodiment of the present invention.

FIG. 1 shows a cross-sectional view of a release material article (release sheet (1)) comprising a substrate (3) and a release material (2). This release material article can be used in various types of pressure-sensitive adhesive tapes or sheets.

Figure 2:
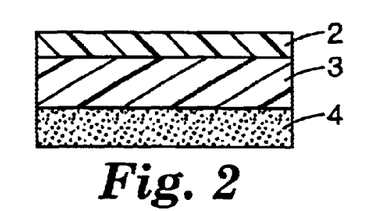
FIG. 2 is a cross-sectional view showing one embodiment of a back-treated tape or sheet using the release sheet of the present invention.

FIG. 2 is a cross-sectional view of a back-treated tape or sheet where a pressure-sensitive adhesive layer (4) is formed on the substrate (3) of a release sheet (1). In this type of tape or sheet, the pressure-sensitive adhesive layer is stacked on the release material layer of a tape or sheet having the same structure.

Figure 3:
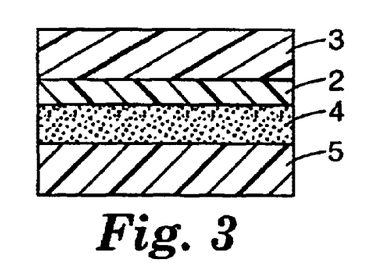
FIG. 3 is a cross-sectional view showing one embodiment of a pressure-sensitive adhesive tape or sheet with a support using the release sheet of the present invention.

FIG. 3 is a cross-sectional view of a pressure-sensitive adhesive tape or sheet where a pressure-sensitive adhesive layer (4) is supported by a support (5).

Figure 4:
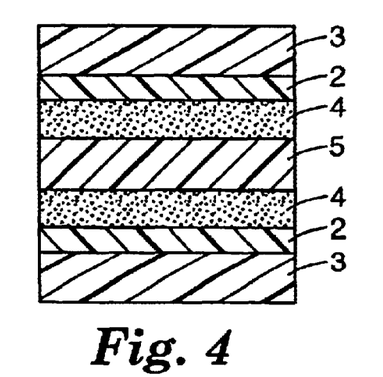
FIG. 4 is a cross-sectional view showing one embodiment of a pressure-sensitive double-coated tape or sheet using the release sheet of the present invention.
Figure 5:
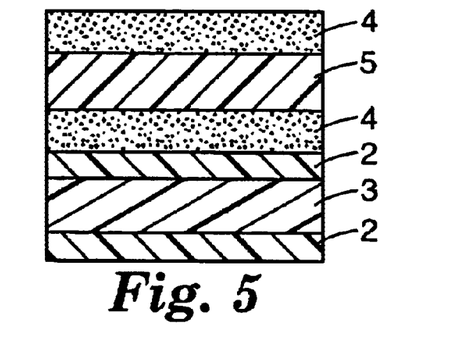
FIG. 5 is a cross-sectional view showing another embodiment of a pressure-sensitive double-coated tape or sheet using the release sheet of the present invention.

FIGS. 4 and 5 are cross-sectional views of a pressure-sensitive adhesive double-coated tape or sheet.

Figure 6:
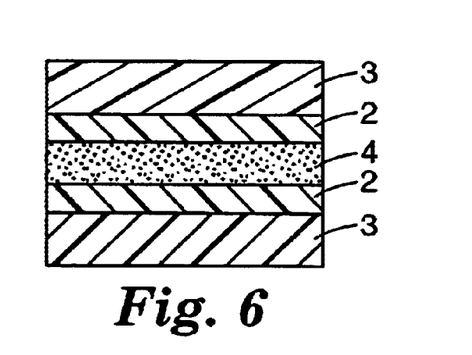
FIG. 6 is a cross-sectional view showing one embodiment of a transfer tape or sheet using the release sheet of the present invention.
Figure 7:
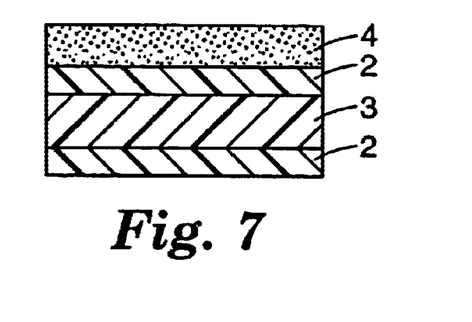
FIG. 7 is a cross-sectional view showing another embodiment of a transfer tape or sheet using the release sheet of the present invention.

FIGS. 6 and 7 are cross-sectional views of a transfer tape or sheet.

In the foregoing part, the present invention is described by referring to preferred embodiments. However, the present invention is not limited thereto. In the case where the release material precursor is a poly(meth)acrylate, this polymer may be constructed by a plurality of monomers and, for example, the first alkyl (meth)acrylate and the second alkyl (meth) acrylate each may be constructed by a plurality of monomers. The monomer component for the polymer constituting the release material precursor in principal does not contain a polar functional group, but as long as the shear storage modulus and the contact angle satisfy the above-described ranges, at least one polar functional group may be contained in the side chain.

Furthermore, the release material precursor is not limited to those copolymers and homopolymers consisting of an alkyl (meth)acrylate. The polymer constituting the release material precursor is not particularly limited as long as the polymer has a shear storage modulus and a contact angle within the above-described range. The polymer may be a polyolefin, which is constituted by a monomer component such as ethylene, propylene, and octene, or a polyvinyl ether, such as ones formed of octadecyl vinyl ether and 2-ethylhexyl vinyl ether. The release material precursor containing such a polymer can have particularly excellent insulating property, weather resistance and solvent resistance.

EXAMPLES

The present invention is described below by referring to the Examples. However, it is easily understood for one skilled in the art that the present invention is not limited thereto. In the following, the "parts" is "parts by weight" in all cases.

Example 1
1. Preparation of Release Material Precursor

In a reactor vessel, 7.2 parts of octadecyl acrylate, 4.8 parts of butyl acrylate and 28 parts of ethyl acetate were uniformly mixed to prepare a solution. To the reaction vessel, 0.004 parts of an initiator of 2,2-azobis(2,4-dimethylvaleronitrile) was further added. This initiator is commercially available under the trade name of V-65 from Wako Pure Chemical Industries, Ltd.

Thereafter, the reactor was purged with nitrogen gas for 10 minutes and then this reactor was transferred to a rotating constant temperature bath at 50° C. and left standing there for 20 hours. It was found that octadecyl acrylate reacted with butyl acrylate in the vessel to produce a release material precursor consisting of an acrylic copolymer within the solution. Thereafter, the weight average molecular weight of this release material precursor was measured by gel permeation chromatography (GPC). In the measurement, a liquid chromatograph (1090 SERIES II) manufactured by Hewlett Packard was used. As a result of the measurement, the release material precursor of this Example was found to have a weight average molecular weight of 800,000 on the basis of polystyrene standard. Also, the shear storage modulus of the release material precursor was measured at 20° C. and a frequency of 1 Hz using a dynamic viscoelasticity analyzer (Dynamic Analyzer RDAII, manufactured by Rheometrics). As a result, the shear storage modulus was found to be $8.5 \times 10^5$ Pa.

2. Manufacture of Release Sheet

The release material precursor prepared above was diluted with ethyl acetate without taking the precursor out of the solution, to prepare a diluted solution having a solid content of 1 wt %. This diluted solution was coated by a bar coater on a polyethylene terephthalate (PET) substrate having a thickness of 50 μm and then the ethyl acetate was evaporated to form a release material precursor layer having a thickness of about 0.1 μm. The resulting sheet was overlaid on a web moving at a web speed of 30 m/min and thereon, an electron beam having a constant adsorbed dose and accelerated by a voltage of 200 kV was irradiated to obtain a release sheet. In this Example, an electron beam having an adsorbed dose of 0 (non-irradiation), 10, 30, 50 or 70 kGy was irradiated to manufacture release sheets.

3. Evaluation of Release Sheet

For each release sheet obtained above, a release strength of the release sheet from the pressure-sensitive adhesive described below, a residual adhesion strength of the pressure-sensitive adhesive after removal of the release sheet and a contact angle of the release sheet with the solution described below were measured and evaluated as follows. On the release sheet, an acrylic pressure-sensitive adhesive sheet (a copolymer formed of monomers containing butyl acrylate, acrylic acid, vinyl acetate and 2-hydroxyethyl acrylate at a weight ratio of 100:8:2:0.2 was crosslinked by adding isophorone diisocyanate corresponding to 1% by weight of the copolymer) was stacked and adhered. The sheet in this state was left standing in an oven at 110° C. for 6 hours. Thereafter, the release sheet was taken out of the oven together with the acrylic pressure-sensitive adhesive sheet and left standing overnight at room temperature.

The release sheet was continuously peeled off from the acrylic pressure-sensitive adhesive sheet using an autograph (AGS-100B) manufactured by Shimadzu Corp., so that the load per 25 mm in width was measured as a release strength. In this measurement, the release angle was 180° and the release speed was 300 mm/min.

The resulting pressure-sensitive adhesive sheet was adhered to a stainless steel plate and then pressed by a roller of 2 kg. In this pressing, the roller was once reciprocated on the pressure-sensitive adhesive sheet at a speed of 300 mm/min. After the pressing, when 20 minutes was passed, the adhesive strength was measured as a residual adhesion strength. In this measurement, the release angle was 180° and the release speed was 300 min/min.

Separately, the release sheet obtained above was measured on the contact angle by a contact angle meter CA-A manufactured by Kyowa Kagaku K. K. In the measurement, a mixed solution of methanol and water (90/10 by volume) having a wet tension of 25.4 mN/m as described in JIS6768:1999 was used. This measurement was performed within 5 seconds after the dripping.

The release strength of each release sheet, the residual adhesion strength of each pressure-sensitive adhesive and the contact angle of each release sheet are shown in Table 1. As apparently seen from Table 1, the release strength was high whenever the adsorbed dose was too small or too large. Particularly, the sample not irradiated with an electron beam lacked the anchoring between the substrate and the release material layer and therefore, the release material transferred into the pressure-sensitive adhesive layer during aging, causing it to be difficult to release from the adhesive layer. Accompanying this transfer, the pressure-sensitive adhesive and the substrate of the release sheet were stuck together and, upon a release strength test, cohesive failure of the pressure-sensitive adhesive layer was observed. From this, it is seen that by irradiating the release material precursor of the present invention with an electron beam, the release sheet comprising a release material having low release strength for a pressure-sensitive adhesive and satisfactorily anchored to the substrate can be formed. Furthermore, when the release sheet not irradiated with an electron beam is compared with the release sheet irradiated with an electron beam having an adsorbed dose of 70 kGy, the contact angle is smaller in the release sheet irradiated with an electron beam. This is considered to result because a polar group was formed on the release sheet surface by the side reaction such as surface oxidation. From these results, it is seen that when the adsorbed dose was 30 kGy, smooth release with lowest release strength was realized and the obtained release sheet maintained sufficiently high residual adhesion strength. However, it is noted that the adsorbed dose for obtaining optimal release strength and sufficiently high residual adhesion strength varies depending on the mixture ratio of the monomers or coating thickness.

TABLE 1

| Absorbed Dose (kGy) | Release Strength (N/25 mm) | Residual Adhesion Strength (N/25 mm) | Contact Angle (°) |
| --- | --- | --- | --- |
| 0 | 10.78 | — | 38.7 |
| 6 | 11.27 | 7.99 | 37.6 |
| 10 | 5.60 | 9.02 | 37.6 |
| 30 | 0.34 | 9.31 | 36.6 |
| 50 | 0.64 | 9.51 | 35.3 |
| 70 | 2.60 | 9.31 | 29.1 |

Example 2

The preparation of release material precursor, the production of release sheet and the evaluation of release sheet were performed in accordance with Example 1 except that 4.8 parts of octadecyl acrylate and 7.2 parts of 2-ethylhexyl acrylate were used in this Example in place of using 7.2 parts of octadecyl acrylate and 4.8 parts of butyl acrylate. The release material precursor of this example had a shear storage modulus of $7.2 \times 10^4$ Pa. The release strength of the release sheet, the residual adhesion strength of the pressure-sensitive adhesive and the contact angle of the release sheet are shown in Table 2. It is seen that in the case of the composition of this Example, smooth release with lowest release strength was realized and at the same time, a sufficiently high residual adhesion strength was maintained when the adsorbed dose was 10 kGy.

TABLE 2

| Absorbed Dose (kGy) | Release Strength (N/25 mm) | Residual Adhesion Strength (N/25 mm) | Contact Angle (°) |
| --- | --- | --- | --- |
| 6 | 0.91 | 9.60 | 27.9 |
| 10 | 0.27 | 10.09 | 27.4 |
| 30 | 0.54 | 8.97 | 26.4 |
| 50 | 2.21 | 6.96 | 24.1 |
| 70 | 2.99 | 4.95 | 21.5 |

Comparative Example 1

A release material precursor was prepared in accordance with Example 1 except that 12.0 parts of octadecyl acrylate was used in this Example in place of using 7.2 parts of octadecyl acrylate and 4.8 parts of butyl acrylate. The production of release sheet and the evaluation of release sheet were performed in accordance with Example 1 except that the release material precursor was diluted with a mixed solvent of ethyl acetate and n-heptane (50/50 by weight) in place of ethyl acetate. The release material precursor of this Example had a shear storage $5 \times 10^7$ Pa. The release strength of the release sheet, the residual adhesion strength of the pressure-sensitive adhesive and the contact angle of the release sheet are shown in Table 3. As is apparently seen from Table 3, in the case of octadecyl acrylate homopolymer, the contact angle was large as compared with Example 1 or 2 where octadecyl acrylate was copolymerized with butyl acrylate or 2-ethylhexyl acrylate. When the contact angle is large, it is expected that the pressure-sensitive adhesive is prevented from wet spreading and the release strength is decreased. However, even if the conditions at the irradiation of electron beam was varied, the release strength was high. Furthermore, in the case of the release material, jerky release was observed due to crystallinity. In particular, although a release material having a relatively low release strength was produced with a relatively low absorbed dose of 50 kGy or 70 kGy, smooth release could not be attained. The above-described relatively high modulus (i.e., $1.5 \times 10^7$ Pa) considered to be caused by this high crystallinity.

TABLE 3

| Absorbed Dose (kGy) | Release Strength (N/25 mm) | Residual Adhesion Strength (N/25 mm) | Contact Angle (°) |
| --- | --- | --- | --- |
| 6 | 12.25 | 6.62 | 50.2 |
| 10 | 11.27 | 6.37 | 49.3 |
| 30 | 8.18 | 5.15 | 48.2 |
| 50 | 2.99 | 10.01 | 48.6 |
| 70 | 2.40 | 10.05 | 45.4 |

TABLE 3-continued

| Absorbed Dose (kGy) | Release Strength (N/25 mm) | Residual Adhesion Strength (N/25 mm) | Contact Angle (°) |
|---|---|---|---|
| 90 | 5.39 | 6.62 | 45.9 |
| 110 | 7.25 | 5.39 | 42.8 |

Comparative Example 2

The preparation of release material precursor, the production of release sheet and the evaluation of release sheet were performed in accordance with Example 1 except that 12.0 parts of butyl acrylate was used in this Example in place of using 7.2 parts of octadecyl acrylate and 4.8 parts of butyl acrylate. The release material precursor of this Example had a shear storage modulus of $3.1 \times 10^4$ Pa. The release strength of the release sheet, the residual adhesion strength of the pressure-sensitive adhesive and the contact angle of the release sheet are shown in Table 4. In the case of butyl acrylate homopolymer, in contrast with the octadecyl acrylate homopolymer in Comparative Example 1, the as very small. Using this, release sheets were manufactured by varying conditions for the irradiation of electron beam but all revealed high.

The contact angle of the release sheet was measured using a mixed solution of methanol and water (90/10 by volume) having a wet tension of 25.4 mN/m described in JIS K6768: 1999 mentioned above. The wet tension of 25.4 mN/m is a relatively low value for the solution used in the wet tension test. This solution was used for the measurement of the contact angle of the release sheet, because a great difference is expected to result among the contact angle values of various release sheets. In the case where a solution having a large wet tension, for example, water (wet tension: 73.0 mN/m) was used in the measurement of the the contact angle was almost 110° in all release sheets and it was difficult to find significant differences among them.

TABLE 4

| Absorbed Dose (kGy) | Release Strength (N/25 mm) | Residual Adhesion Strength (N/25 mm) | Contact Angle (°) |
|---|---|---|---|
| 3 | 3.77 | 8.09 | 12.2 |
| 4.5 | 3.82 | 7.84 | 11.3 |
| 6 | 3.68 | 7.79 | 11.5 |
| 10 | 3.72 | 7.89 | 10.7 |
| 30 | 5.68 | 7.60 | 10.8 |
| 50 | 6.62 | 8.33 | 10.1 |
| 70 | 7.60 | 8.00 | 8.2 |

Comparative Example 3

The preparation of release material precursor, the production of release sheet and the evaluation of release sheet were performed in accordance with Example 1 except that the release material precursor was formed from an octadecyl acrylate/acrylic acid copolymer (molar ratio of monomers: 60/40) which is commonly used as a back surface treating agent. The release strength of each release sheet of this Example is shown in Table 5. In the case of coating the octadecyl acrylate/acrylic acid copolymer, cohesive failure of the pressure-sensitive adhesive was observed not only in the sample non-irradiated with electron beam but also in all samples and thus, the samples were verified not to serve as a release sheet without measuring the contact angle and the shear storage modulus. This is caused because the release material contained acrylic acid, which is an acrylic component having high polarity. The affinity for the pressure-sensitive adhesive was, therefore, increased during the aging at a high temperature. Due to the occurrence of cohesive failure in the pressure-sensitive adhesive, the residual adhesion strength could not be measured.

TABLE 5

| Absorbed Dose (kGy) | Release Strength (N/25 mm) |
|---|---|
| 0 | 20.97 |
| 6 | 20.09 |
| 10 | 22.34 |
| 30 | 19.40 |
| 50 | 20.68 |
| 70 | 20.45 |

Example 3

The preparation of release material precursor, the production of release sheet and the evaluation of release sheet were performed in accordance with Example 1 except that a constant energy amount of ultraviolet ray was irradiated in this Example in place of irradiating electron beam on the release material precursor layer. In this Example, the ultraviolet ray was irradiated using a high-pressure mercury lamp (Model H bulb) manufactured by Fusion System Corporation. Also, by irradiating ultraviolet ray having an energy of 0 (non-irradiated), 10, 20, 40, 80 or 20, respective release sheets were manufactured. The release strength of the release sheet, the residual adhesion strength of the pressure-sensitive adhesive and the contact angle of the release sheet are shown in Table 6. As is apparently seen from the Table, the release strength was high whichever the irradiation energy was too small or too large. Particularly, the sample not irradiated with ultraviolet ray lacked the anchoring between the substrate and the release material layer and therefore, the release material was transferred into the pressure-sensitive adhesive layer during aging to cause increase in the release strength. Accompanying this transfer into the pressure-sensitive adhesive, the pressure-sensitive adhesive and the substrate of the release sheet were stuck together and upon a release strength test, a cohesive failure was observed in the pressure-sensitive adhesive layer. It is also seen that when the irradiation energy is too large, a side reaction such as surface oxidation takes place and the release strength becomes high. In other words, by irradiating an appropriate does of ultraviolet ray on the coated release material precursor, the release sheet which has anchoring of the release material to the substrate and at the same time, realize smooth release with low release strength, can be formed.

TABLE 6

| Irradiation Energy (mJ/cm$^2$) | Release Strength (N/25 mm) | Residual Adhesion Strength (N/25 mm) | Contact Angle (°) |
|---|---|---|---|
| 0 | 10.58 | — | 38.7 |
| 10 | 5.15 | 10.19 | 38.8 |
| 20 | 0.25 | 9.60 | 38.8 |
| 40 | 0.29 | 10.44 | 37.9 |

TABLE 6-continued

| Irradiation Energy (mJ/cm$^2$) | Release Strength (N/25 mm) | Residual Adhesion Strength (N/25 mm) | Contact Angle (°) |
|---|---|---|---|
| 80 | 0.35 | 10.29 | 37.4 |
| 200 | 0.80 | 10.05 | 34.5 |

Example 4

A release material precursor was prepared in the same manner as in Example 3 except that 6.0 parts of octadecyl acrylate and 6.0 parts of butyl acrylate were used, namely, the weight ratio of octadecyl acrylate and butyl acrylate was changed to 50/50, in this Example in place of using 7.2 parts of octadecyl acrylate and 4.8 parts of butyl acrylate. From this release material precursor, a release sheet was produced in the same manner as in Example 3 except that the ultraviolet irradiation dose was fixed to 40 mJ/cm$^2$. The release material precursor of this Example had a shear storage modulus of $4.4 \times 10^5$ Pa.

Example 5

The preparation of release material precursor and the production of release sheet were performed in the same manner as in Example 4 except that 4.8 parts of octadecyl acrylate and 7.2 parts of butyl acrylate were used, namely, the weight ratio of octadecyl acrylate and butyl acrylate was changed to 40/60, in this Example in place of using 6.0 parts of octadecyl acrylate and 6.0 parts of butyl acrylate. The release material precursor of this Example had a shear storage modulus of $1.3 \times 10^5$ Pa.

Comparative Example 4

The preparation of release material precursor and the production of release sheet were performed in the same manner as in Comparative Example 1 except that an ultraviolet ray having an energy amount of 40 mJ/cm$^2$ was irradiated in this Example in place of irradiating electron beam on the release material precursor layer.

Comparative Example 5

The preparation of release material precursor and the production of release sheet were performed in the same manner as in Comparative Example 2 except that an ultraviolet ray having an energy amount of 40 mJ/cm$^2$ was irradiated in this Example in place of irradiating electron beam on the release material precursor layer.

The release sheets of Examples 4 and 5 and Comparative Examples 4 and 5 were measured and evaluated on the release strength, the residual adhesion strength and the contact angle in the same manner as in Example 1 except for using an acrylic pressure-sensitive adhesive sheet (a copolymer formed of a monomer containing butyl acrylate, acrylic acid and vinyl acetate at a weight ratio of 10:8:2 and crosslinked by adding isophorone diisocyanate corresponding to 1.3% of the copolymer) having an adhesive strength of about 25 N/25 mm to a stainless steel plate in place of the acrylic pressure-sensitive adhesive having an adhesive strength of about 10 N/25 mm.

The release strength of each release sheet, the residual adhesion strength of each pressure-sensitive adhesive and the contact angle of each release sheet, of Examples 4 and 5 and Comparative Examples 4 and 5 are shown in Table 7.

As seen from Tables 6 and 7, the release sheet of Comparative Example 4 has a contact angle higher than that of Examples 3 to 5. From this, the release sheet of Comparative Example 4 is expected to prevent the wet spreading of the pressure-sensitive adhesive and reduce the release strength. However, the release material precursor has a shear storage modulus higher than those of Examples 3 to 5 due to its crystallinity. As a result, as apparently seen from Table 7, the release strength thereof is disadvantageously very high.

It was revealed that the release material precursor of Comparative Example 5 has a shear storage modulus on the same level as that of Examples 3 to 5, whereas the release sheet of Comparative Example 5 has a contact angle lower than that of Examples 3 to 5. As apparently seen from Table 7, this sheet disadvantageously has very high release strength, similarly to the release sheet of Comparative Example 4.

TABLE 7

| Example | ODA/BA (octadecyl acrylate/butyl acrylate) | Release Strength (N/25 mm) | Residual Adhesion Strength (N/25 mm) | Contact Angle (°) |
|---|---|---|---|---|
| Comparative Example 4 | 100/0 | 1.7 | 21.3 | 50.5 |
| Example 4 | 50/50 | 0.28 | 23.7 | 23.7 |
| Example 5 | 40/60 | 0.38 | 24.0 | 20.5 |
| Comparative Example 5 | 0/100 | 2.5 | 22.6 | 11.8 |

Example 6

A release material precursor sheet was prepared in accordance with Example 1 except that ultraviolet ray was irradiated in a nitrogen atmosphere reduced to an oxygen concentration of 30 ppm or less in place of irradiating ultraviolet ray on the PET substrate immediately after the formation of the release material precursor layer. The production and the evaluation of release sheet were performed in accordance with Example 3. To speak more specifically, a release material precursor layer was provided on a PET substrate and this release material precursor layer together with the substrate was placed in a quartz glass-made sealed container. Into the container, nitrogen gas was introduced to perform the purging until the oxygen concentration became 30 ppm or less and immediately, a constant energy amount of ultraviolet ray was irradiated. The irradiated energy amount was 40, 80 or 200 mJ/cm$^2$. The results of tests on release strength of each release sheet and the residual adhesion strength of each pressure-sensitive adhesive are shown in Table 8. On comparison with the results in Table 6 for ultraviolet irradiation in air, it is seen that the level of release strength and residual adhesion strength under the conditions of giving lowest release is almost the same whichever in air or in nitrogen atmosphere the ultraviolet ray was irradiated. On the other hand, when excess ultraviolet ray is irradiated, the release strength is increased due to the surface oxidation as in the case of the irradiation in air but the degree of increase is relatively small in the sheet irradiated in a nitrogen atmosphere.

TABLE 8

| Irradiation Energy (mJ/cm$^2$) | Release Strength (N/25 mm) | Residual Adhesion Strength (N/25 mm) |
|---|---|---|
| 40 | 0.28 | 10.17 |
| 80 | 0.33 | 10.03 |
| 200 | 0.67 | 10.09 |

Example 7

A release material precursor was prepared in accordance with Example 1 except that 12 parts of lauryl methacrylate containing an alkyl group having 12 carbon atoms was used in this Example in place of using 7.2 parts of octadecyl acrylate and 4.8 parts of butyl acrylate. In this case, the release material precursor had a shear storage modulus of 8.6×10$^5$ Pa. Using this release material precursor, the production and the evaluation of release sheet were performed in accordance with Example 3. The release strength of each release sheet, the residual adhesion strength of each pressure-sensitive adhesive and the contact angle of each release sheet are shown in Table 9. As is apparently seen from the Table, in the case of non-irradiation or excessively small irradiation energy, the anchoring between the substrate and the release material layer was weak, and therefore the release material was transferred into the pressure-sensitive adhesive layer. As a result, the pressure-sensitive adhesive and the substrate of the release sheet were stuck together and the release strength became high. On the other hand, in the case of irradiation of ultraviolet ray in a sufficiently high amount, the obtained release sheet had low release strength of no more than 2N/25 mm. Also, with the release material of this Example, it was seen that jerky release was not observed and smooth release could be obtained.

TABLE 9

| Irradiation Energy (mJ/cm$^2$) | Release Strength (N/25 mm) | Residual Adhesion Strength (N/25 mm) | Contact Angle (°) |
|---|---|---|---|
| 0 | 17.80 | — | 31.8 |
| 10 | 10.75 | 8.58 | 31.5 |
| 20 | 10.95 | 9.05 | 31.6 |
| 40 | 1.59 | 11.26 | 31.0 |
| 80 | 1.38 | 11.45 | 30.2 |
| 120 | 1.33 | 9.82 | 28.1 |

Example 8

A release material precursor was prepared in accordance with Example 1 except that 20 parts of 2-heptylundecyl acrylate dissolved in 20 parts of the above-described ethyl acetate/n-heptane mixed solvent was used in this Example in place of using 7.2 parts of octadecyl acrylate and 4.8 parts of butyl acrylate. In this case, the release material precursor had a shear storage modulus of 1.2×10$^3$ Pa. Using this release material precursor, the production and the evaluation of release sheet were performed in accordance with Example 3 except that an ethyl acetate/n-heptane mixed solvent was used to dilute the solution. The release strength of the release sheet, the residual adhesion strength of the pressure-sensitive adhesive and the contact angle of the release sheet, at an irradiation energy of 100 mJ/cm$^2$, are shown in Table 10.

As is apparently seen from Table 10, the release sheet of this Example comprises a polymer consisting of 2-heptylundecyl acrylate containing an alkyl group having 18 carbon atoms on the side chain. Nevertheless, the release strength thereof is low as compared with that of Examples 4 and 5 where the release sheet comprises a polymer partially consisting of octadecyl acrylate having the same carbon atom number of 18. Accordingly, it was found that a desirable release sheet can be obtained by using a homopolymer of a branched alkyl(meth)acrylate as in this Example. This makes a striking contrast to the release material (Comparative Example 4) consisting of octadecyl acrylate homopolymer, which exhibits high shear storage modulus at room temperature due to the crystallization of the side chain.

TABLE 10

| Example | Release Strength (N/25 mm) | Residual Adhesion Strength (N/25 mm) | Contact Angle (°) |
|---|---|---|---|
| Example 8 | 0.16 | 23.3 | 38.2 |

Example 9

The release material precursor of this Example was prepared in the same manner as in Example 8 from 2-heptylundecyl acrylate and isobornyl acrylate according to the blend ratio (weight ratio) shown in Table 11. Using this release material precursor, the production and the evaluation of release sheet were performed in accordance with Example 8. The release strength of release sheet, the residual adhesion strength of pressure-sensitive adhesive and the contact angle of release sheet are shown in Table 11.

As seen from Table 11, with the increase in the ratio of isobornyl acrylate, the shear storage modulus elevates. This occurs because the isobornyl acrylate has a high glass transition point. In turn, as apparent from the Table, the release strength also increases.

TABLE 11

| 2-HUDA/IBXA (2-heptylundecyl acrylate/isobornyl acrylate | Release Strength (N/25 mm) | Residual Adhesion Strength (N/25 mm) | Contact Angle (°) | Shear Storage Modulus (Pa) |
|---|---|---|---|---|
| 85/15 | 0.23 | 24.5 | 34.6 | 3.3 × 10$^3$ |
| 75/25 | 0.40 | 25.7 | 31.0 | 7.8 × 10$^3$ |
| 50/50 | 13.3 | 23.0 | 26.7 | 4.1 × 10$^6$ |

Example 10

The release material precursor of this Example was prepared in the same manner as in Example 8 from 2-heptylundecyl acrylate and 2-ethylhexyl acrylate according to the blend ratio (weight ratio) shown in Table 12. Using this release material precursor, the production and the evaluation of release sheet were performed in accordance with Example 8. The release strength of release sheet of this Example, the residual adhesion strength of pressure-sensitive adhesive and the contact angle of release sheet are shown in Table 12.

As seen from Table 12, whatever the ratio of 2-ethylhexyl acrylate is varied, the shear storage modulus is almost constant. This occurs because the 2-ethylhexyl acrylate has a very low glass transition point. In turn, as apparent from the Table, low release strength is constantly maintained.

TABLE 12

| 2-HUDA/2-EHA (2-heptylundecyl acrylate/2-ethylhexyl acrylate) | Release Strength (N/25 mm) | Residual Adhesion Strength (N/25 mm) | Contact Angle (°) | Shear Storage Modululs (Pa) |
|---|---|---|---|---|
| 85/15 | 0.16 | 21.4 | 35.6 | $1.8 \times 10^3$ |
| 75/25 | 0.16 | 21.8 | 34.4 | $4.7 \times 10^3$ |
| 50/50 | 0.22 | 25.2 | 32.4 | $6.2 \times 10^3$ |

Example 11

A release sheet was produced in the same manner as in Example 3 except that the substrate on which the release material precursor is coated was biaxially oriented polypropylene (subjected to corona treatment) in this Example. The release strength of release sheet, the residual adhesion strength of pressure-sensitive adhesive and the contact angle of release sheet are shown in Table 12. As apparently seen from the Table, similarly to Example 3, the release strength is high whichever too small or too large the irradiation energy is. On the other hand, when an appropriate amount of ultraviolet ray is irradiated on the coated release material precursor, even if the substrate is changed to polypropylene, the release material anchors the substrate and the release sheet obtained exhibits low release strength and realizes smooth release. For the purpose of providing lower release strength, it can be said that polyethylene terephthalate is more excellent as the substrate.

TABLE 13

| Irradiation Energy ($mJ/cm^2$) | Release Strength (N/25 mm) | Residual Adhesion Strength (N/25 mm) | Contact Angle (°) |
|---|---|---|---|
| 0 | 7.06 | 9.20 | 38.9 |
| 10 | 4.41 | 9.45 | 38.1 |
| 20 | 2.21 | 10.31 | 34.9 |
| 40 | 0.83 | 10.05 | 36.4 |
| 80 | 0.96 | 9.55 | 37.6 |
| 200 | 1.22 | 9.40 | 33.6 |

Example 12

In this example, an ethylene/propylene copolymer comprising the ethylene component of 75% by weight (EP01P, produced by JSR) was used as the release material precursor. The shear storage modulus of the release material precursor of this Example was determined according to the measuring method described above and found to be $4.5 \times 10^5$ Pa. Then, this ethylene/propylene copolymer was dissolved in toluene/methyl ethyl ketone mixed solvent (50/50 by weight) to prepare a solution of release material precursor and thereafter, ultraviolet ray having an irradiation energy of 0 (non-irradiation), 20, 40, 80, 120 or 400 $mJ/cm^2$ as irradiated in the same manner as in Example 3 to prepare release sheets. The release sheets obtained were evaluated using the same acrylic pressure-sensitive adhesive sheet as used in Example 4. The shear storage modulus of release material precursor, the release strength of release sheet, the residual adhesion strength of pressure-sensitive adhesive and the contact angle of release sheet are shown in Table 14. As apparently seen from the Table, the release strength is high whichever too small or too large the irradiation energy is. Particularly, the sample not irradiated with ultraviolet ray lacked the anchoring between the substrate and the release material and therefore, the release material was transferred into the pressure-sensitive adhesive layer during aging to cause increase in the release strength. Furthermore, the pressure-sensitive adhesive and the substrate of the release sheet were stuck together and upon a release strength test, cohesive failure was observed in the pressure-sensitive adhesive layer. In addition, it is seen that if the irradiation energy is too large, a side reaction such as surface oxidation takes place and the release strength elevates. From this Example, a release sheet which has anchoring to a substrate and realize smooth release with low release strength can be formed by coating the release material precursor and irradiating an appropriate dose of ultraviolet ray thereon, using not only poly(meth)acrylate but also polyolefin such as ethylene.propylene copolymer.

TABLE 14

| Irradiation Energy ($mJ/cm^2$) | Release Strength (N/25 mm) | Residual Adhesion Strength (N/25 mm) | Contact Angle (°) |
|---|---|---|---|
| 0 | 33.3 | — | 29.9 |
| 20 | 18.5 | 16.8 | 28.9 |
| 40 | 1.41 | 27.8 | 27.8 |
| 80 | 0.22 | 25.7 | 26.2 |
| 120 | 0.24 | 24.6 | 24.9 |
| 400 | 0.35 | 25.5 | 25.6 |

Example 13

In this Example, the production and evaluation of release sheet were performed, where two kinds of ethylene/propylene copolymers each having almost the same weight ratio of ethylene component as in Example 12 were used as the release material precursor and ultraviolet ray having a dose of 80 $mJ/cm^2$ was irradiated in accordance with Example 12. The release strength of release sheet of this Example, the residual adhesion strength of pressure-sensitive adhesive, the contact angle of release sheet, the weight ratio of ethylene component (C2 component) and the shear storage modulus of the release material shown in Table 15.

It is seen from this Table that when the weight ratio of ethylene component is almost the same, as the shear storage modulus of the release material precursor increases, the release strength of the release sheet also increases. Particularly, the release material precursor consisting of an ethylene/propylene copolymer commercially available under the trade name of EP961SP from JSR has a high shear storage modulus and, therefore, imparts high release strength to the release sheet. On the other hand, in the case of EP912P, the shear storage modulus is low and, therefore, the release sheet is imparted with low release strength.

TABLE 15

| Trade Name[a] | Release Strength (N/25 mm) | Residual Adhesion Strength (N/25 mm) | Contact Angle (°) | C2 Component (%) | Shear Storage Modulus (Pa) |
|---|---|---|---|---|---|
| EP912P | 0.17 | 22.5 | 26.6 | 75 | $2.2 \times 10^5$ |
| EP961SP | 4.3 | 23.9 | 28.3 | 74 | $3.4 \times 10^6$ |

[a]ethylene/propylene rubber produced by JSR.

Example 14

In this Example, an ethylene/octene copolymer (Engage 8407, produced by Du Pont Dow Elastomers) and an ethylene/butene copolymer (EBM3021P, produced by JSR)

each was used as the release material precursor and the shear storage modulus thereof was measured by the method described above. Thereafter, each release material precursor was dissolved in a toluene/n-heptane mixed solvent (50/50 by weight) to prepare a release material precursor solution. Using these, release sheets were manufactured and evaluated in the same manner as in Example 4. The shear storage modulus of the release material precursor, the release strength of the release sheet, the residual adhesion strength of the pressure-sensitive adhesive, and the contact angle of the release sheet are shown in Table 16.

It is seen from this Table that two release material precursors have a shear storage modulus on the same level as the ethylene/propylene copolymer (EP01P) of Example 12 and, similarly, each gives an excellent release sheet capable of exhibiting low release strength.

TABLE 16

| Material | Release Strength (N/25 mm) | Residual Adhesion Strength (N/25 mm) | Contact Angle (°) | Shear Storage Modulus (Pa) |
|---|---|---|---|---|
| Ethylene/octene copolymer | 0.45 | 22.9 | 29.2 | $2.6 \times 10^5$ |
| Ethylene/butene copolymer | 0.27 | 21.7 | 27.3 | $3.3 \times 10^5$ |

Example 15

In this Example, polyoctene was used as the release material precursor. This polymer was obtained starting from 1-octene by a coordinated anionic polymerization using a Ziegler.Natta catalyst. More specifically, a glass-made reactor having a stirring bar and a condenser was dried. Into this reactor, argon was filled, cooling water was circulated into the condenser, and reactants of 132 parts of 1-octene, 394 parts of toluene and 0.54 ml of diethylaluminum chloride (1.8M in toluene) were fed. The reaction was initiated by adding 0.10 g of AATiCl$_3$ (aluminum activated reducing titanium chloride, Stauffer catalyst). During the reaction, the temperature was kept at 25° C. After the reaction for 5 hours, the polymer was precipitated with large excess methanol and the remaining catalyst was extracted. Subsequently, the methanol solution was transferred to another vessel and the precipitated polymer was separated and dried in a vacuum oven.

The weight average molecular weight of the release material precursor of this Example was evaluated in accordance with Example 1 and found to be 1,760,000. The obtained polyoctene was again diluted with toluene to prepare a release material precursor solution having a solid content of 1 wt % and using this, a release sheet was manufactured and evaluated in the same manner as in Example 13.

The shear storage modulus of the release material precursor, the release strength of the release sheet, the residual adhesion strength of the pressure-sensitive adhesive, and the contact angle of the release sheet are shown in Table 17. It is seen from this Table that even when a release sheet is manufactured from a polyolefin homopolymer, the obtained release sheet exhibits low release strength and is an excellent release sheet.

TABLE 17

| Example | Release Strength (N/25 mm) | Residual Adhesion Strength (N/25 mm) | Contact Angle (°) | Shear Storage Modulus (Pa) |
|---|---|---|---|---|
| Example 15 | 0.35 | 25.1 | 36.9 | $3.7 \times 10^4$ |

According to the present invention, the release material has high anchoring to a substrate, the release strength from a pressure-sensitive adhesive is relatively low even after the exposure to a high temperature, and the pressure-sensitive adhesive can hold stable residual adhesion strength.

What is claimed is:

1. A release material formed by irradiating a release material precursor,
   wherein said release material precursor has a shear storage modulus of about $1 \times 10^2$ to about $3 \times 10^6$ Pa, when measured at 20° C. and at a frequency of 1 Hz, and
   wherein said release material has a contact angle of 15° or more, as measured using a mixed solution of methanol and water (volume ratio: 90/10) having a wet tension of 25.4 mN/m.

2. The release material according to claim 1, wherein the release strength of the release material from an acrylic pressure-sensitive adhesive, as measured at a release angle of 180° and at a release rate of about 300 mm/min, is about 0.05 to about 2 N/25 mm.

3. The release material according to claim 1, wherein said release material comprises at least one member selected from polyolefins, poly(meth)acrylates and polyvinyl ethers.

4. The release material according to claim 3, wherein said polyolefin is formed from at least one olefin monomer having about 2 to about 12 carbon atoms.

5. The release material according to claim 3, wherein said poly(meth)acrylate is a copolymer derived from a monomer component comprising at least one first alkyl (meth)acrylate containing an alkyl group having about 12 to about 30 carbon atoms and at least one second alkyl (meth)acrylate containing an alkyl group having 1 to about 12 carbon atoms.

6. The release material according to claim 3, wherein said poly(meth)acrylate is a homopolymer derived from a monomer component of an alkyl (meth)acrylate containing an alkyl group having about 8 to about 30 carbon atoms.

7. A release material article comprising a substrate having release material layer on at least a portion thereof, wherein the release material comprises the release material of claim 1, and wherein said release material layer is formed by coating said release material precursor on a substrate and then irradiating a radiation said release material precursor.

8. The release material article according to claim 7, wherein said release material layer has a thickness of about 0.01 to about 1 μm.

9. The release material article according to claim 7, wherein a pressure-sensitive layer is provided on said release material layer.

10. The release material article according to claim 7, wherein said substrate comprises a polyester-based film selected from polyethylene terephthalate, polyethylene naphthalate, and polybutylene terephthalate.

11. The release material article according to claim 9, wherein said pressure-sensitive layer comprises an acrylic pressure-sensitive adhesive, which acrylic pressure-sensitive adhesive comprises a (meth)acrylic resin.

12. A process for producing a release material article, the process comprising a step of:

coating a release material precursor onto a substrate, wherein the release material precursor has a shear storage modulus of about $1 \times 10^2$ to about $3 \times 10^6$ Pa, when measured at 20° C. and at a frequency of 1 Hz, and a step of:

irradiating said release material precursor to form a release material layer having a contact angle of 15° or more, as measured using a mixed solution of methanol and water (volume ratio: 90/10) having a wet tension of 25.4 mN/m.

* * * * *

UNITED STATES PATENT AND TRADEMARK OFFICE
CERTIFICATE OF CORRECTION

PATENT NO. : 6,660,354 B2
DATED : December 9, 2003
INVENTOR(S) : Suwa Toshihiro

It is certified that error appears in the above-identified patent and that said Letters Patent is hereby corrected as shown below:

Column 12,
Line 5, delete "example" and insert in place thereof -- Example --.
Line 55, insert -- is -- before "considered".

Column 13,
Line 24, after "the" delete "as" and insert in place thereof -- contact angle was --.
Line 25, after "varying" insert -- the --.
Line 26, after "high" insert -- release strength --.
Line 38, after "of the" insert -- contact angle, --.

Column 14,
Line 53, delete "does" and insert in place thereof -- dose --.

Column 19,
Line 45, delete "example" and insert in place thereof -- Example --.
Line 55, delete "as" and insert in place thereof -- was --.

Column 20,
Line 39, after "material" insert -- precursor are --.
Line 61, delete "$^{(a)}$" and insert in place thereof -- (a): --.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,660,354 B2
DATED : December 9, 2003
INVENTOR(S) : Suwa, Toshihiro It is certified that error appears in the above-identified patent and that said Letters Patent is hereby corrected as shown below:

<u>Column 12,</u>
Line 37, delete "$5 \times 10^7$" and insert in place thereof -- modulus of $1.5 \times 10^7$ --.

Signed and Sealed this

Sixth Day of September, 2005

JON W. DUDAS
*Director of the United States Patent and Trademark Office*